US011711593B2

(12) United States Patent
Vartakavi

(10) Patent No.: US 11,711,593 B2
(45) Date of Patent: **\*Jul. 25, 2023**

(54) AUTOMATED GENERATION OF BANNER IMAGES

(71) Applicant: Gracenote, Inc., Emeryville, CA (US)

(72) Inventor: Aneesh Vartakavi, Emeryville, CA (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,898

(22) Filed: Sep. 18, 2021

(65) Prior Publication Data

US 2022/0256250 A1    Aug. 11, 2022

Related U.S. Application Data

(63) Continuation of application No. 17/173,667, filed on Feb. 11, 2021, now Pat. No. 11,172,271.

(51) Int. Cl.
*H04N 21/84* (2011.01)
*H04N 21/81* (2011.01)
(Continued)

(52) U.S. Cl.
CPC ............ *H04N 21/84* (2013.01); *G06N 20/00* (2019.01); *H04N 21/4856* (2013.01); *H04N 21/4858* (2013.01); *H04N 21/8146* (2013.01)

(58) Field of Classification Search
CPC ............ H04N 21/84; H04N 21/4856; H04N 21/4858; H04N 21/8146; G06N 20/00
See application file for complete search history.

(56) References Cited

U.S. PATENT DOCUMENTS

| 11,172,271 B1* | 11/2021 | Vartakavi | G06N 20/00 |
| 2006/0064716 A1* | 3/2006 | Sull | G06F 16/784 |
| | | | 715/201 |

(Continued)

OTHER PUBLICATIONS

Unpublished U.S. Appl. No. 16/749,702, filed Jan. 22, 2020 in the name of Aneesh Vartakavi et al.

(Continued)

*Primary Examiner* — Kyu Chae
(74) *Attorney, Agent, or Firm* — McDonnell Boehnen Hulbert & Berghoff LLP

(57) ABSTRACT

Example systems and methods for automated generation of banner images are disclosed. A program identifier associated with a particular media program may be received by a system, and used for accessing a set of iconic digital images and corresponding metadata associated with the particular media program. The system may select a particular iconic digital image for placing a banner of text associated with the particular media program, by applying an analytical model of banner-placement criteria to the iconic digital images. The system may apply another analytical model for banner generation to the particular iconic image to determine (i) dimensions and placement of a bounding box for containing the text, (ii) segmentation of the text for display within the bounding box, and (iii) selection of font, text size, and font color for display of the text. The system may store the particular iconic digital image and banner metadata specifying the banner.

20 Claims, 10 Drawing Sheets

(51) Int. Cl.
  *H04N 21/485* (2011.01)
  *G06N 20/00* (2019.01)

(56) References Cited

U.S. PATENT DOCUMENTS

| | | | |
|---|---|---|---|
| 2017/0006349 A1* | 1/2017 | Song | G06F 16/51 |
| 2018/0012630 A1 | 1/2018 | Thomee et al. | |
| 2018/0203832 A1 | 7/2018 | Zhang et al. | |
| 2019/0069007 A1* | 2/2019 | Bodas | H04N 19/44 |

OTHER PUBLICATIONS

Unpublished U.S. Appl. No. 16/749,724, filed Jan. 22, 2020 in the name of Aneesh Vartakavi et al.

* cited by examiner

AUTOMATED GENERATION OF BANNER IMAGES

CROSS-REFERENCE TO RELATED APPLICATIONS

This application is a continuation of and claims priority to U.S. patent application Ser. No. 17/173,667, filed Feb. 11, 2021, which is incorporated herein by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method carried out by a computer-implemented system configured for automated generation of banner images is disclosed. The method may include: receiving a program identifier (PID) associated with a particular media program, the PID identifying for the system the particular media program from among a plurality of media programs known to the system; based on the PID, accessing a set of iconic digital images and corresponding metadata associated with the particular media program; selecting a particular iconic digital image on which to place a banner for display of particular text associated with the particular media program, by applying an analytical model of banner-placement criteria to one or more of the iconic digital images of the set of iconic digital images; applying an analytical model for banner generation to the particular iconic digital image and the corresponding metadata to determine each of: (i) dimensions and placement on the particular iconic digital image of a particular bounding box for containing the particular text, (ii) segmentation of the particular text for display within the particular bounding box, and (iii) selection of font, text size, and font color for display of the particular text; and storing, in non-transitory computer-readable memory, the particular iconic digital image and banner metadata specifying the particular text, the determined dimensions and placement on the particular iconic digital image of the particular bounding box, the determined segmentation of the particular text within the particular bounding box, and the determined font, text size, and font color of the particular text.

In another aspect, a system for automated generation of banner images is disclosed. The system may include one or more processors, and memory storing instructions that, when executed by the one or more processors, cause the system to carry out operations including: receiving a program identifier (PID) associated with a particular media program, the PID identifying for the system the particular media program from among a plurality of media programs known to the system; based on the PID, accessing a set of iconic digital images and corresponding metadata associated with the particular media program; selecting a particular iconic digital image on which to place a banner for display of particular text associated with the particular media program, by applying an analytical model of banner-placement criteria to one or more of the iconic digital images of the set of iconic digital images; applying an analytical model for banner generation to the particular iconic digital image and the corresponding metadata to determine each of: (i) dimensions and placement on the particular iconic digital image of a particular bounding box for containing the particular text, (ii) segmentation of the particular text for display within the particular bounding box, and (iii) selection of font, text size, and font color for display of the particular text; and storing, in non-transitory computer-readable memory, the particular iconic digital image and banner metadata specifying the particular text, the determined dimensions and placement on the particular iconic digital image of the particular bounding box, the determined segmentation of the particular text within the particular bounding box, and the determined font, text size, and font color of the particular text.

In still another aspect, a non-transitory computer-readable medium having instructions stored thereon for automated generation of banner images is disclosed. The instructions, when executed by one or more processors of a system for automated generation of banner images, may cause the system to carry out operations including: receiving a program identifier (PID) associated with a particular media program, the PID identifying for the system the particular media program from among a plurality of media programs known to the system; based on the PID, accessing a set of iconic digital images and corresponding metadata associated with the particular media program; selecting a particular iconic digital image on which to place a banner for display of particular text associated with the particular media program, by applying an analytical model of banner-placement criteria to one or more of the iconic digital images of the set of iconic digital images; applying an analytical model for banner generation to the particular iconic digital image and the corresponding metadata to determine each of: (i) dimensions and placement on the particular iconic digital image of a particular bounding box for containing the particular text, (ii) segmentation of the particular text for display within the particular bounding box, and (iii) selection of font, text size, and font color for display of the particular text; and storing, in non-transitory computer-readable memory, the particular iconic digital image and banner metadata specifying the particular text, the determined dimensions and placement on the particular iconic digital image of the particular bounding box, the determined segmentation of the particular text within the particular bounding box, and the determined font, text size, and font color of the particular text.

DETAILED DESCRIPTION

I. Overview

Figure 1:
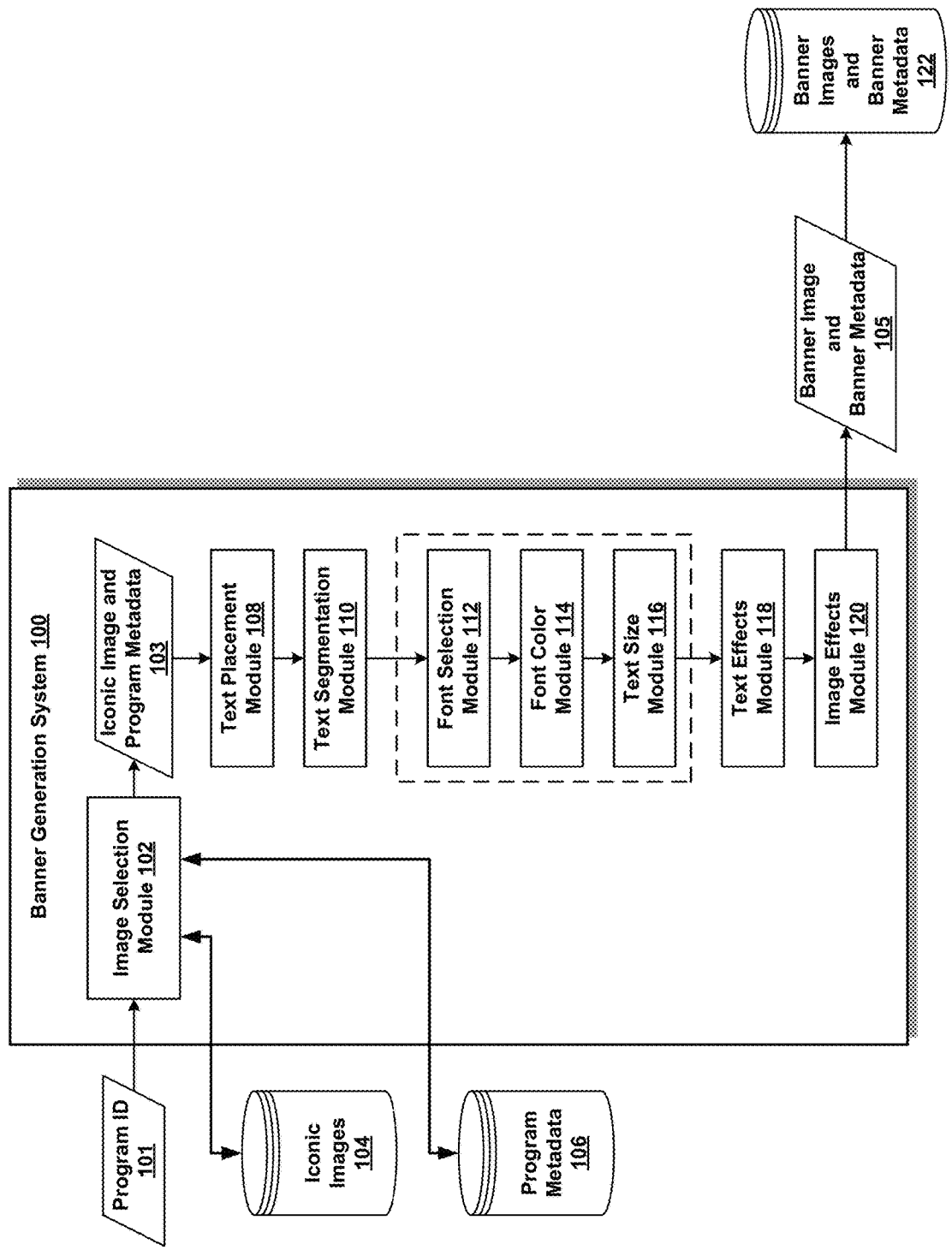
FIG. 1 is a simplified block diagram of an automated banner image generation system in which various disclosed principles can be implemented.

Content providers may provide various forms of image-based content to end users, including video content and still image content. A content provider may be a direct source of content for end users, or may provide content to one or more content distribution services, such as broadcasters, which then deliver selected content to end users. Content may include digital and/or analog still images and/or video images. An example of a content provider could be a media content company that provides media content to media distribution services, which then deliver media content to end users. End users may subscribe at a cost to one or more media distribution services or directly to one or more media content companies for content delivery, and/or may receive at least some content at no charge, such as from over-the-air broadcasters or from public internet websites that host at least some free content for delivery to end users.

A content provider and/or content distribution service may be interested identifying certain visual features associated with delivered content to enable the identified features to be called out for attention or consideration to end users. Calling attention to visual features may be useful for content providers and/or content distribution services for promotional purposes, such as sponsor and/or product advertising, and program content promotion, and for example. In practice, content may be organized or contained as a program, such as a movie, TV show, sports event, or newscast, for example. The term "media program," "content program," and/or just "program," will be used herein to refer to such content. Identification of particular visual features associated with media programs may be part of value added services for end users, such as electronic program guides (EPGs) or other program control functions.

Of particular interest may be images of a content program, such as a TV program or packet network video streaming program, annotated with one or another form of text associated with the program. A common example of annotation is the title of a program, such as a movie title or TV program title, though other information associated with a program, such as a cast member or director, may be used as annotation. The annotation on program images is sometimes referred to as a "banner." The term "banner image" is sometimes used to refer the image with the overlaid annotation. There may be value in providing a banner image of a TV or streaming media program. In an example embodiment, banner images with titles may be provided to content delivery service providers, who may then display the banner images to end users as they browse program menus or guides.

Banner images may also include stylistic features or enhancements related or connected to the genre of the programs, particular types of programs (e.g., sports, movie, news, etc.), or other characteristics. Non-limiting examples may include font types, font styles, font colors, font effects (e.g., "icicle" text, "melting" text, etc.), and image effects. Other stylistic or aesthetic features of banner images may include where on an image a banner is placed, and how multi-word text of a banner is broken or subdivided into separate lines of text in the banner.

Conventional techniques for generating banner images may involve a significant amount of human crafting and/or artistic judgement in order to, for example, select an appropriate/representative/best image associated with a particular content program (e.g., movie, TV program, etc.), determine the genre of the program, determine a "preferred" placement of the banner on the image (e.g., avoiding placement that covers or obscures faces or other significant image features), and select font, font color and size, how to break up multi-word text. These and other steps of banner image generation can be relatively time-consuming when performed manually, as is done conventionally. At the same time, a content provider may wish to generate banner images for tens or hundreds of thousands, or even millions, of content programs. Consequently, conventional manual generation of banner images may be impractical, if not unequal to the task.

In view at least of the need for banner images, and the challenges to conventional approaches to generating them, the inventor has recognized that the overall procedure for generating banner images can be broken down into relatively discrete phases, each one of which may be addressed using various analytical modeling techniques that may be implemented by one or more computing devices or systems. In particular, rule-based models and/or various types of machine learning models may be applied to each of the particular phases of generating banner images, thereby automating the process and procedures for generation of banner images. Advantageously, by automating generation of banner images for content programs, such as movies, TV programs, and the like, content providers may practically and efficiently fill the need for providing content distribution services with banner images for a wide range and large volume of content programs—a need that cannot be reasonably met using conventional banner image generation techniques.

II. Architecture

A. Example System for Automated Generation of Banner Images

FIG. 1 is a simplified block diagram of an example automated banner image generation system 100 that may be configured to automate generation of banner images. The automated banner image generation system 100 can include various components, any one or more of which may be implemented as or in one or more computing devices. As such, components of the automated banner image generation system 100 may themselves be or include hardware, software, firmware, or combinations thereof. Some of the components of the automated banner image generation system 100 are identified structurally, such as databases or other forms of data storage and management, and others are identified in terms of their operation or function. Operational and/or functional components could be implemented as software and/or hardware modules, for example, and will be referred to herein as "modules" for the purpose of the present discussion.

Non-limiting example components of the automated banner image generation system 100 include iconic images 104 (e.g., a database), program metadata 106 (e.g., a database), image selection module 102, text placement module 108, text segmentation module 110, font selection module 112, font color module 114, text size module 116, text effects module 118, image effects module 120, and banner images and banner metadata 122 (e.g., a database). Note that the iconic images 104, program metadata 106, and banner images and metadata 122 are depicted as external to the banner generation system 100, and may therefore be considered as separate elements. However, other arrangements in which one or more of these databases are configured within the system itself are possible as well.

The automated banner image generation system 100 can also include one or more connection mechanisms that connect various components within the ML predictor system 100. By way of example, the connection mechanisms are depicted as arrows between components. The direction of an arrow may indicate a direction of information flow, though this interpretation should not be viewed as limiting.

In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. A connection mechanism may also include programmed communication between software and/or hardware modules or applications, such as application program interfaces (APIs), for example. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The iconic images database 104 includes preselected images associated with known content programs, and the program metadata database 106 includes metadata associated with the known content programs. The preselected images may include a set of images for each given known content program that have been previously selected based on image content deemed to be relevant or representative of the given known content program. The images of each set may have also been processed in some way, such as cropped to a particular size and aspect ratio, for example. As such, each preselected image of a set may, for example, be considered an aesthetically appropriate or desirable image for representing, identifying, or marketing the given known content program—hence the term "iconic image." The metadata associated with the given known program may include such information as program title, type of content program (e.g., movie, TV program, sports program, newscast, etc.), cast (e.g., for movies or TV programs, for example), production information, languages (e.g., for content programs available in multiple languages), as well as iconic image metadata associated with the corresponding set of iconic images for the given known content program (e.g., image cropping boundary coordinates, aspect ratios, etc.). It should be understood that the specific program metadata could include more, fewer, and/or different information than that listed hereinabove by way of example.

The iconic images database 104 may also include for each set of preselected images one or more "raw" images corresponding to one or more versions of unprocessed iconic images. For example, a raw images may be uncropped versions of iconic images. While iconic images may generally be preferentially considered as candidates for banner images, there may be instances in which raw images might also or alternatively be considered. Thus, as described below, iconic images and/or raw images may serve as a pool of candidate images for banner images.

The automated banner image generation system 100 may be described as follows. By way of example, and without limitation, the content program will be taken to be a movie, although it could be another type of program. Also by way of example, and without limitation, the text used for the banner will be taken to be the movie title, which may be considered typical for a banner image.

As shown the image selection module 102 may take a program identifier (ID) 101 identifying a particular movie as input, and select an iconic image and program metadata 103 by accessing the iconic images 104 and program metadata 106. (Accessing the databases may include retrieving and (re)storing data records, for example, and is indicated by the double arrows in FIG. 1.) More specifically, the program ID may be used to access and retrieve iconic images and metadata associated with the particular movie. The image selection module 102 may apply an ML predictor model to one or more retrieved iconic images in order to determine which may be optimally suited for placement of a title banner.

In selecting an iconic image, the image selection module—e.g., the ML predictor model—may recognize particular features or types of features of the selected iconic image that make it particularly suited or appropriate for use as a banner image. Non-limiting examples of such features or types of features may include one or more faces of movie characters, building structures or geologic features relevant to the movie title and/or genre, blank space or image regions of relatively low interest that could be obscured or covered by a banner without detracting from the image theme, or one or more image regions that satisfy one or more criteria for banner placement. In making the selection, the image selection module 102 may also determines specific regions of interest (ROIs) that contain recognized features, as well as one or more low-interest ROIs devoid of any such features. The iconic image and program metadata 103 output from the image selection module 102 may also include metadata defining or specifying the identified ROIs (including low interest ones).

In some instances, the selection module 102 may determine that none of the preselected iconic images are suitable for banner placement. For example, the cropping characteristics of all of the iconic images for a particular movie (or other content program) may be such that no image region is suitable for banner placement (e.g., without unacceptably obscuring other image content). When such a determination is made, the selection module 102 may invoke an image cropping process that generates a suitable, alternative iconic image from one or more raw images associated with the particular movie. For example, the alternative iconic image may be cropped in a manner that accommodates acceptable banner placement. As an example, the alternative cropping might provide for an empty or low-interest image region that can be acceptably obscured by a banner. Examples of techniques for automated cropping of raw images are described in U.S. patent application Ser. No. 16/749,702 filed Jan. 22, 2020, and U.S. patent application Ser. No. 16/749,724 filed Jan. 22, 2020, the entireties of both of which are hereby incorporated by reference herein.

Continuing with the description of the automated banner image generation system 100, the text placement module 108 takes the iconic image and program metadata 103 as input and generates a bounding box for a banner. The bounding box may be defined by coordinates in the selected iconic image. For example, the banner bounding box may be located in a low-interest ROI identified by the image selection module 102. As described below, the text placement module 108 may be an analytical model implemented as a rule-based model and/or a ML predictor model.

The text segmentation module 110 determines how to break up the text of the banner to fit within the banner bounding box. For the current illustrative example, the banner text is taken to be a movie title. Breaking up the text may involve considerations the number of words in the title, the language of the title, the genre of the movie, and the size of the bounding box, among other possible factors. As also described below, the text segmentation module 110 may be an analytical model implemented as a rule-based model and/or a ML predictor model.

The font selection module 112, font color module, 114, and text size module 116 select the font, font color, and text size of the banner, as indicated. These modules are depicted as a group, suggestive of their related functions. Each may be an analytical model implemented as a rule-based model and/or a ML predictor model, as also described below.

The text effects module 118 may use such factors as genre, title meaning, and image content to apply one or another type of text effect to the banner text. Non-limiting examples of text effects include such characteristics as ice or icicle text (e.g., for winter/cold themes or genres), melting text (e.g., for summer/hot themes or genres), "dripping blood" text (e.g., for horror themes or genres), and flowers or "cartoony" animals (e.g., for children's themes or genres). Other text effects could include shadowing and/or reflections. The text effects module 118 could also be an analytical model implemented as a rule-based model and/or a ML predictor model, as described below.

Using similar factors as the text effects module 118, the image effects module 118 apply such image effects as border glow or halos, color gradients, and shadow. As with other modules, the image effects module 118 could be an analytical model implemented as a rule-based model and/or a ML predictor model, as described below.

The output of the automated banner image generation system 100 is banner image and banner metadata 105, which may be stored in the banner images and banner metadata 122. The banner image and banner metadata 105 may include a banner image that includes the banner overlaid on the selected iconic image according to the characteristics determined by the various modules of the system 100. Additionally or alternatively, the banner image and banner metadata 105 may include the selected image and associated metadata that may be used to create the banner and overlay the banner on the image according to the characteristics determined by the various modules of the system 100.

The banner images and banner metadata 122 may serve as a repository of banner images and metadata that can provided to content distributers. In some embodiments, content distributers may be provided directly with banner images associated with content programs. In other embodiments, content distributers may be provided with an API or other access means for downloading banner images from the banner images and banner metadata 122.

As noted, the automated banner image generation system 100 and/or components thereof can take the form of, be part of, or include or encompass, a computing system or computing device. Before describing example operation of an example automated banner generation system, an example of a computing system or device is first described.

B. Example Computing System

Figure 2:
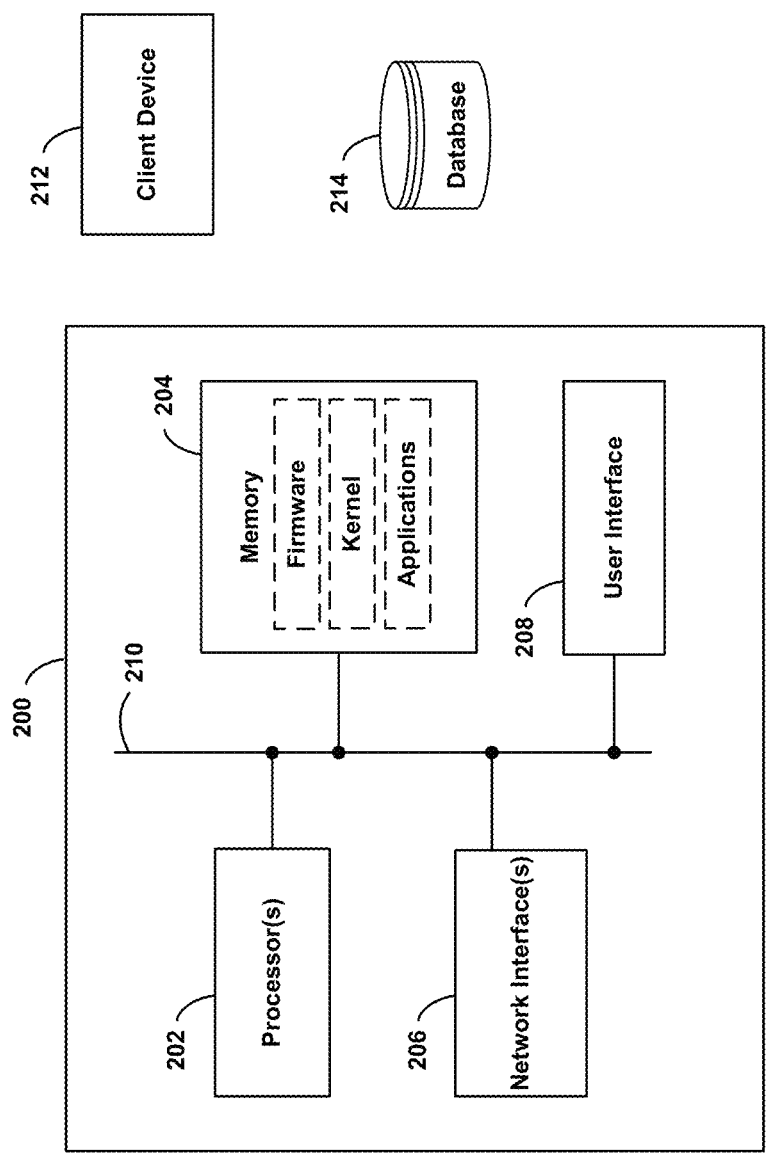
FIG. 2 is a simplified block diagram of an example computing system in which various disclosed principles can be implemented.

FIG. 2 is a simplified block diagram of an example computing system (or computing device) 200. The computing system 200 can be configured to perform and/or can perform one or more acts, such as the acts described in this disclosure. As shown, the computing device 200 may include processor(s) 202, memory 204, network interface(s) 206, and an input/output unit 208. By way of example, the components are communicatively connected by a bus 210. The bus could also provide power from a power supply (not shown).

Processors 202 may include one or more general purpose processors and/or one or more special purpose processors (e.g., digital signal processors (DSPs) or graphics processing units (GPUs). Processors 202 may be configured to execute computer-readable instructions that are contained in memory 204 and/or other instructions as described herein.

Memory 204 may include firmware, a kernel, and applications, among other forms and functions of memory. As described, the memory 204 may store machine-language instructions, such as programming code or non-transitory computer-readable storage media, which may be executed by the processor 202 in order to carry out operations that implement the methods, scenarios, and techniques as described herein. In some examples, memory 204 may be implemented using a single physical device (e.g., one magnetic or disc storage unit), while in other examples, memory 204 may be implemented using two or more physical devices. In some examples, memory 204 may include storage for one or more machine learning systems and/or one or more machine learning models as described herein.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. In one example, the communication interface 206 can be a wired interface, such as an Ethernet interface. In another example, the communication interface 206 can be a wireless interface, such as a cellular or WI-FI interface.

The user interface 208 can allow for interaction between the computing system 200 and a user of the computing system 200, if applicable. As such, the user interface 208 can include, or provide an interface connection to, input components such as a keyboard, a mouse, a touch-sensitive panel, and/or a microphone, and/or output components such as a display device (which, for example, can be combined with a touch-sensitive panel), and/or a sound speaker. In an example embodiment, the client device 212 may provide user interface functionalities.

The computing system 200 can also include one or more connection mechanisms that connect various components within the computing system 200. For example, the computing system 200 can include a connection mechanism 210 that connects components of the computing system 200, as shown in FIG. 2.

Network interface(s) 206 may provide network connectivity to the computing system 200, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

Client device 212 may be a user client or terminal that includes an interactive display, such as a GUI. Client device 212 may be used for user access to programs, applications, and data of the computing device 200. For example, a GUI could be used for graphical interaction with programs and applications described herein. In some configurations, the client device 212 may itself be a computing device; in other configurations, the computing device 200 may incorporate, or be configured to operate as, a client device.

Database 214 may include storage for input and/or output data, such as the iconic image database 104, the program metadata database 106, and/or banner images and banner metadata database, 122, referenced above and described in more detail below.

In some configurations, the computing system 200 can include one or more of the above-described components and can be arranged in various ways. For example, the computer system 200 can be configured as a server and/or a client (or perhaps a cluster of servers and/or a cluster of clients) operating in one or more server-client type arrangements, for instance.

III. Example Operations

Figure 3:
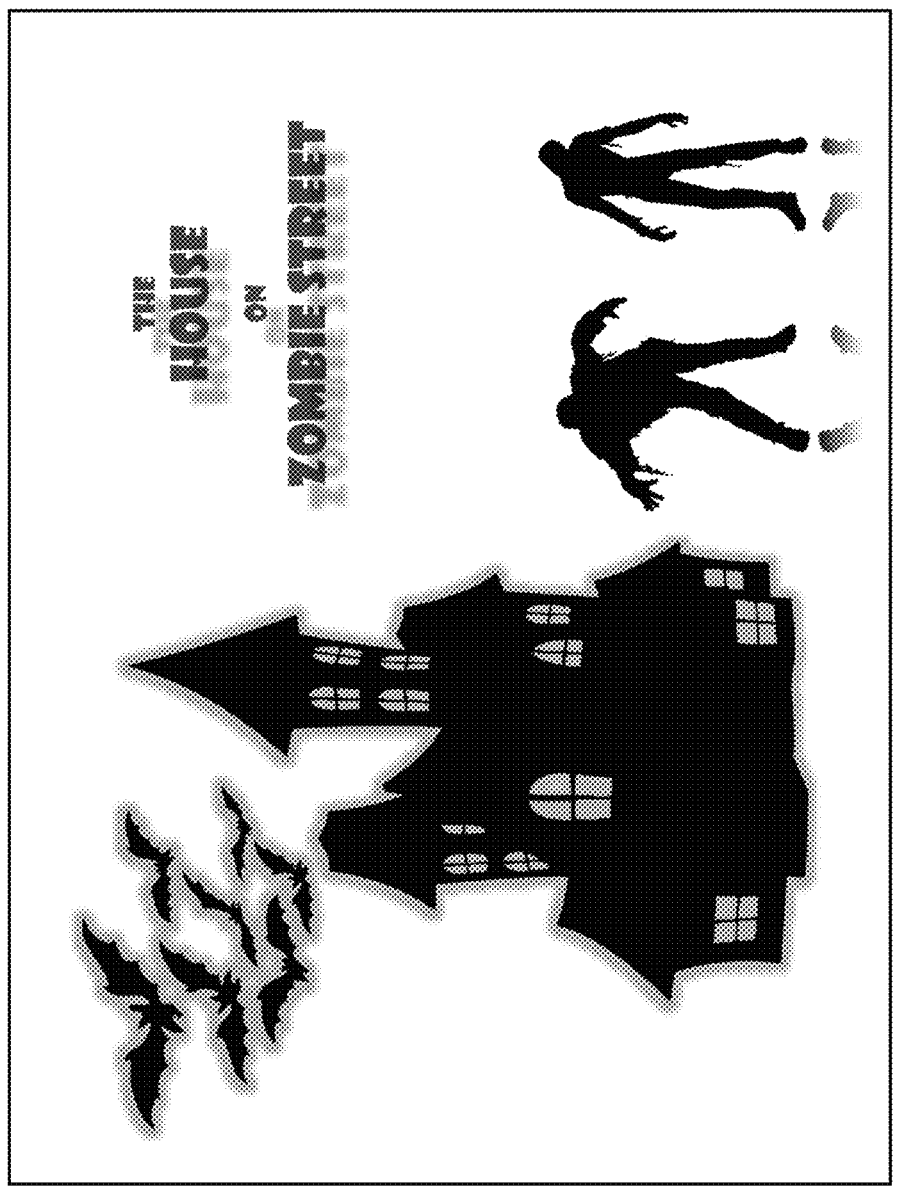
FIG. 3 illustrates an example banner image, in accordance with example embodiments.

FIG. 3 illustrates a caricature or conceptual representation of an example banner image that could be generated by the automated banner image generation system 100, in accordance with example embodiments. As indicated, the banner image of FIG. 3 is for a content program entitled "The House on Zombie Street," a movie and title made up for the purposes of illustrative discussion herein. As shown, the iconic image of the banner image includes a haunted house, several bats evidently flying above the house, and two apparent zombies, depicted in silhouette. The banner image is a caricature in the sense that it may be representative of a digital photographic image or video frame, for example. Nevertheless, the banner image of FIG. 3 serves to illustrate various aspects of banner images generally and, in reference to the automated banner image generation system 100 of FIG. 1 and FIGS. 4A-4D below, may further serve to illustratively describe example operations of the system 100 used to generate banner images.

More specifically, the example banner image illustrates different ROIs in a selected iconic image, banner placement, text segmentation, font, text size, font effects, and image effects. Because the example banner image is rendered in black and white, font color is not necessarily illustrated, although it may be easily envisioned within the context of the following discussion. As is evident, the banner is placed in a relatively empty portion of the iconic image; the text segmentation and font are also evident by inspection. By way of example, the font effect is shadowing. The image effects include reflection beneath the silhouetted zombies, and glow surrounding the haunted house and bats.

A. Example Automated Banner Image Generation

Figure 4A:
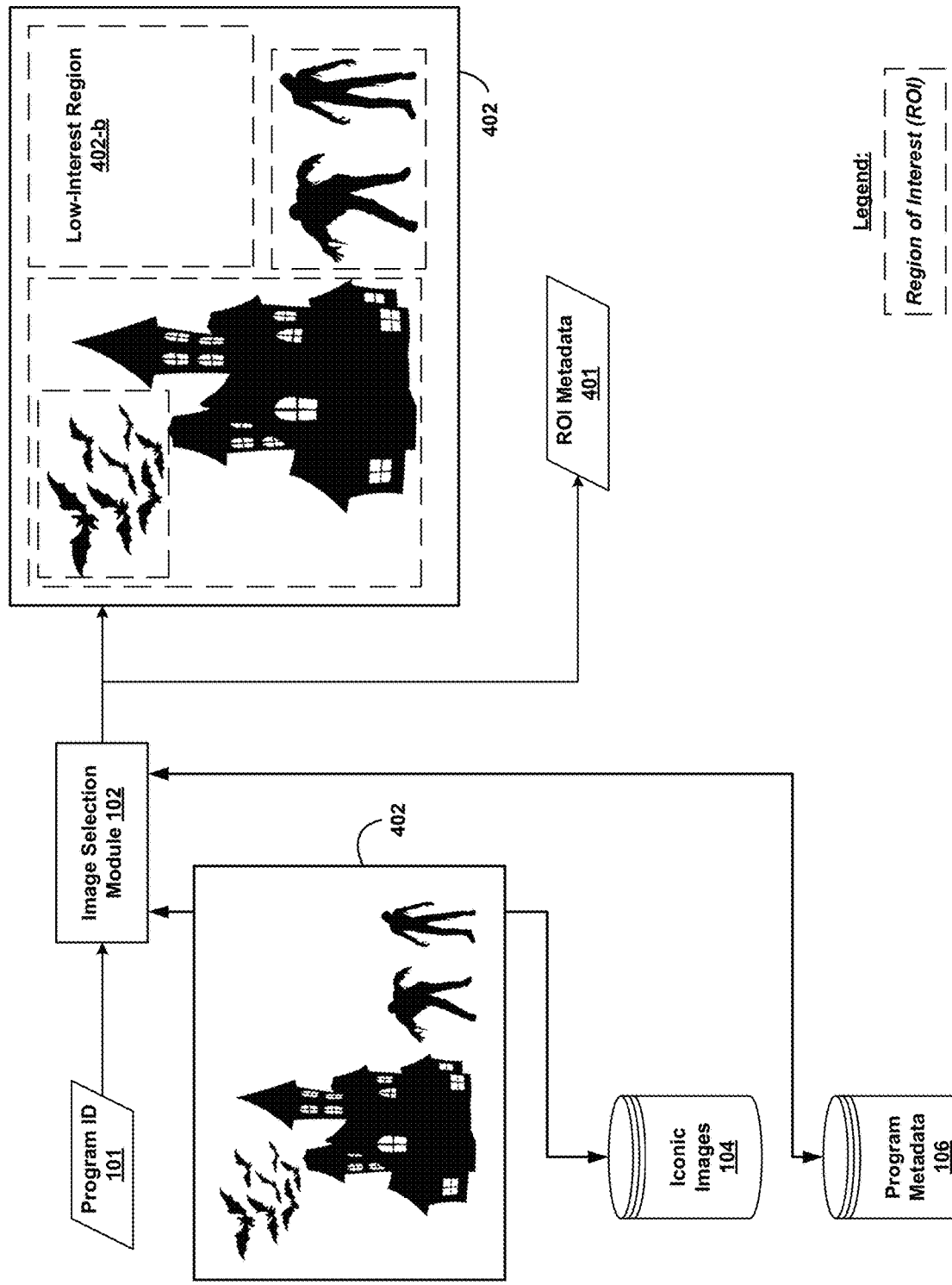
FIGS. 4A-4D illustrate example operational steps involved in automated banner image generation, in accordance with example embodiments.

FIGS. 4A-D illustrate example operational steps involved in automated banner image generation, in accordance with example embodiments. By way of example the operational steps are described in the context of generating the example banner image of FIG. 3 for the movie "The House on Zombie Street" by the automated banner image generation system 100. As shown in FIG. 4A, the process starts with the inputting of a program ID 101 to the image selection module 102. The program ID 101 could be some form of encoding, such as an ID number, or it could be the movie title. The program ID 101 could further encode, indicate, or include what particular text should be used for the banner. For example, the program ID may be provided in a record or form that indicates that the title or an actor's name should be the text for the banner. Alternatively, the system 100 could be operated in a default mode that choose default text, such as the title, if no other indication is provided as input. Other arrangements are possible as well. For the present illustration, the banner text is taken to be the movie title.

For a movie available in multiple languages, the program ID could be specific to one of the languages, or could be accompanied by a language specifier. The input to the image selection module 102 could alternatively or additionally be a list of program IDs that cause the process to run for all the programs identified by ID list.

As shown, the image selection module 102 uses the program ID to access the iconic images database 104 and the program metadata 106. In an example embodiment, the image selection module may retrieve a set of iconic images for the identified movie, and then apply a ML predictor model to determine which one is optimally suited for placement of a banner. In making this evaluation, the image selection module 102 may also retrieve some or all of the metadata for the identified movie in order to determine properties such as genre and title (if the title is not supplied with the program ID), for example.

The image selection module 102 may determine the optimal iconic image by recognizing particular image content that meets selection criteria, such as faces, building structures, or other topical content in one or more of the set of iconic images. By further recognizing and scoring various ROIs, candidate iconic images may be ranked, and an optimal one selected. The scoring of ROIs could be based on recognition of a topical content, including empty or low-interest space. In the example operation, the image selection module selects an iconic image 402 and determines four ROIs. The four ROIs may be specified by image coordinates recorded in ROI metadata 401. As a visual cue in FIG. 4A, the four ROIs are also conceptually depicted as dashed boxes (as indicated by the legend at the bottom right of the figure) on the iconic image 402. As shown, the ROIs contain bats, a haunted house, two zombies, and one low-interest region 402-b. The ROI metadata may also include information about the topical content of each ROI, such as the determined score or other quantifiable characteristic. The image selection module 102 may then output the iconic image 402 and ROI metadata 401.

Figure 4B:
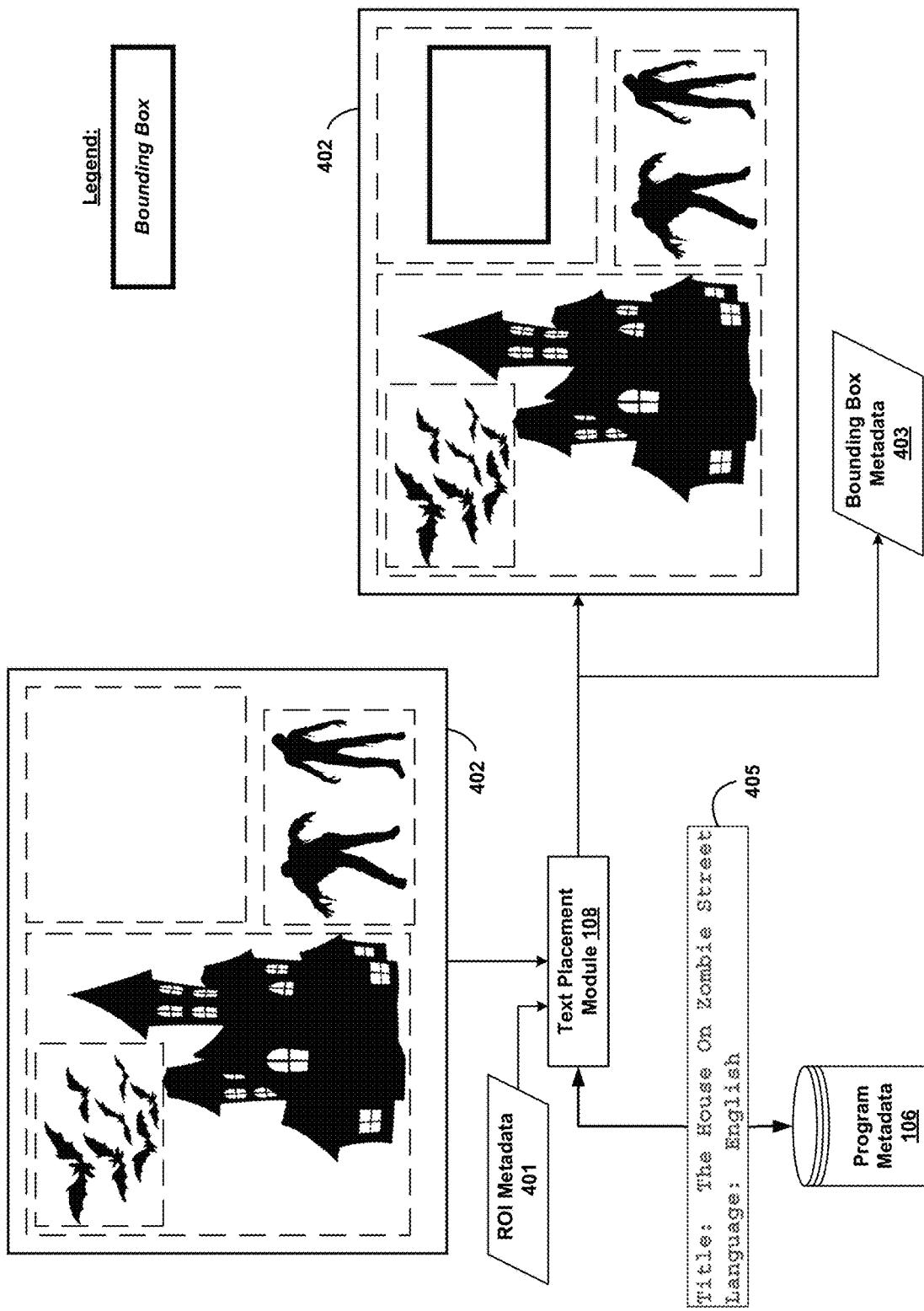

As shown next in FIG. 4B, the iconic image 402 and the ROI metadata 401 may be input to the text placement module 108, which may apply an analytical model for determining where to place the banner, generating banner bounding box coordinates to quantify banner placement. In doing so, the low-interest region 404-b may be considered a candidate location on the image. The analytical model may be a rules-based model that considers the ROIs as described in the ROI metadata 401 in the context of banner-placement rules. In another embodiment, the analytical model could be a ML predictor model that employs an artificial neural network trained with known examples of banner placement in order to predict optimal banner placement in iconic images, for example.

In example operation, the text placement module 108 may access the program metadata 106 to retrieve the title and language 405 of the movie. In this example, the language is English. The text placement module 108 may specify the banner placement by generating a bounding box coordinates, recorded in bounding box metadata 403, such as image coordinates. In the example, the coordinates correspond to a bounding box within the low-interest region 402-b. As a visual cue in FIG. 4B, the banner bounding box is conceptually depicted as a rectangle drawn in a heavy black line (as indicated by the legend at the top right of FIG. 4B) on the iconic image 402. The text placement module 108 may then output the iconic image 402 and bounding box metadata 403.

Figure 4C:
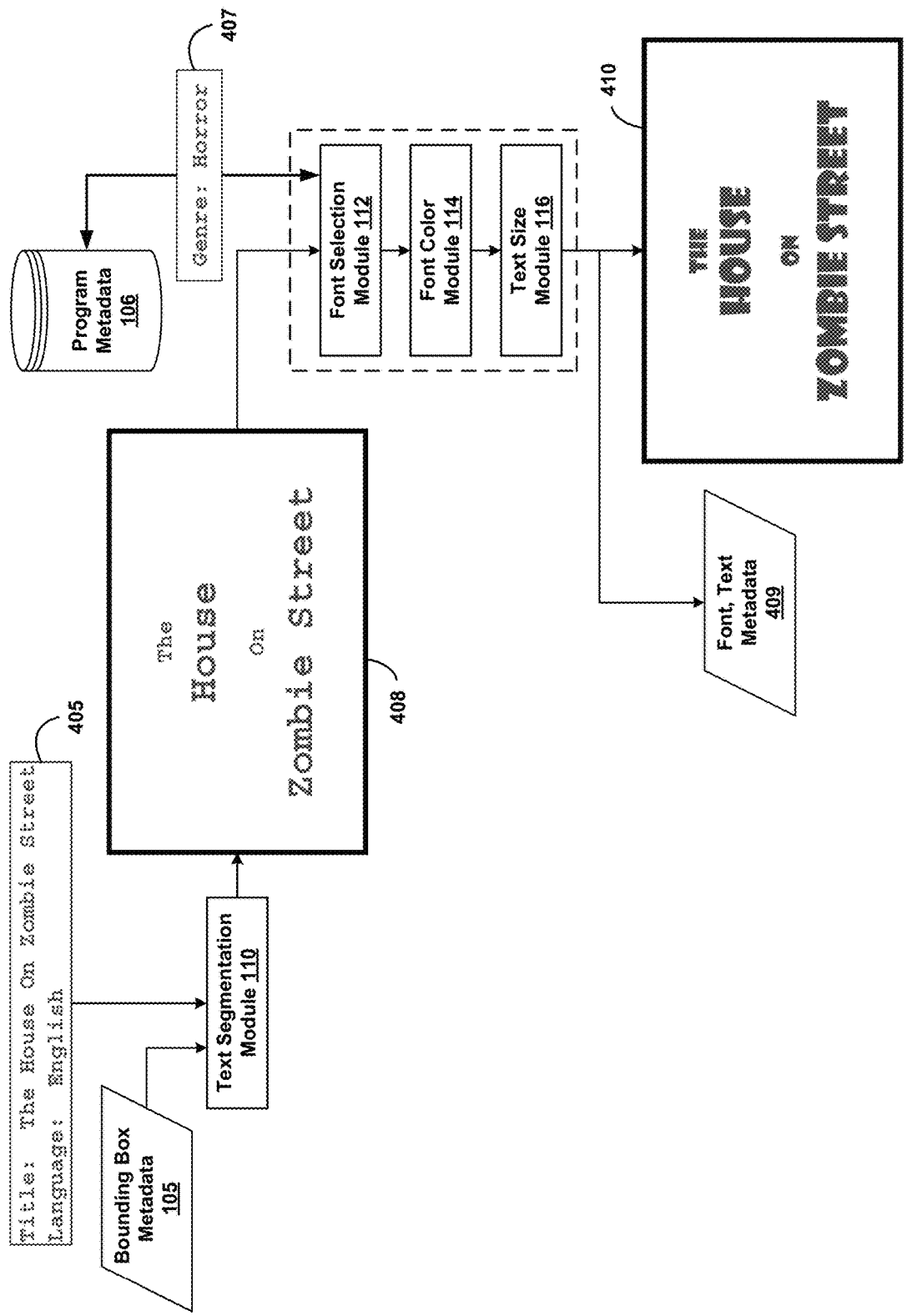

As shown next in FIG. 4C, bounding box metadata 403 and the title and language 405 may be input to the text segmentation module 110, which may apply an analytical model for determining how to break up or distribute multi-word text across one or more text lines within the specified banner bounding box. The analytical model may be a rules-based model that considers text of the movie title and the banner bounding box size and aspect ratio in the context of text segmentation rules. In another embodiment, the analytical model could be a ML predictor model that employs an artificial neural network trained with known examples of text segmentation in order to predict optimal segmentation or distribution of text within the constraints of a bounding box, for example. Segmentation may also adjust the relative size of the text. This is illustrated in the example by the smaller size of the words "The" and "On" in the example title. The text segmentation module 110 may then output the segmented text 408.

As also shown in FIG. 4C, the font selection module 112 may receive the segmented text 408 as input, and may also access the program metadata 106 to determine the movie genre 407, which in this example illustration "horror." The font selection module 112 may apply an analytical model for selecting the font according to the movie genre, for example. The analytical model may be a rules-based model for font selection, or a ML predictor model trained with known examples of fonts associated with particular genres.

Operations of selection of font color and text size are related to font selection, and may be carried out by the font color module 114 and the text size module 116.

Each of these may also be implemented as analytical models, again, using a rules-based models and/or ML predictor models. The inputs to these modules may also be the segmented text 408 and genre 407, and may further include the selected font and, for the text size module 116, the font color. All three font operations—font selection, font color, and text size—may be considered three aspects of font processing, as indicated by the dashed rectangle enclosing all three font modules. In some embodiments, all three could be implemented as a single module.

The output of the font processing is the font and text metadata 409, which describes the selected font, font color, and text size. As noted above, color selection is not explicitly illustrated in the black-and-white renderings of FIGS. 3 and 4A-4D. The banner corresponding to the segmented text with the font selections applied is depicted conceptually in the banner box 410.

Figure 4D:
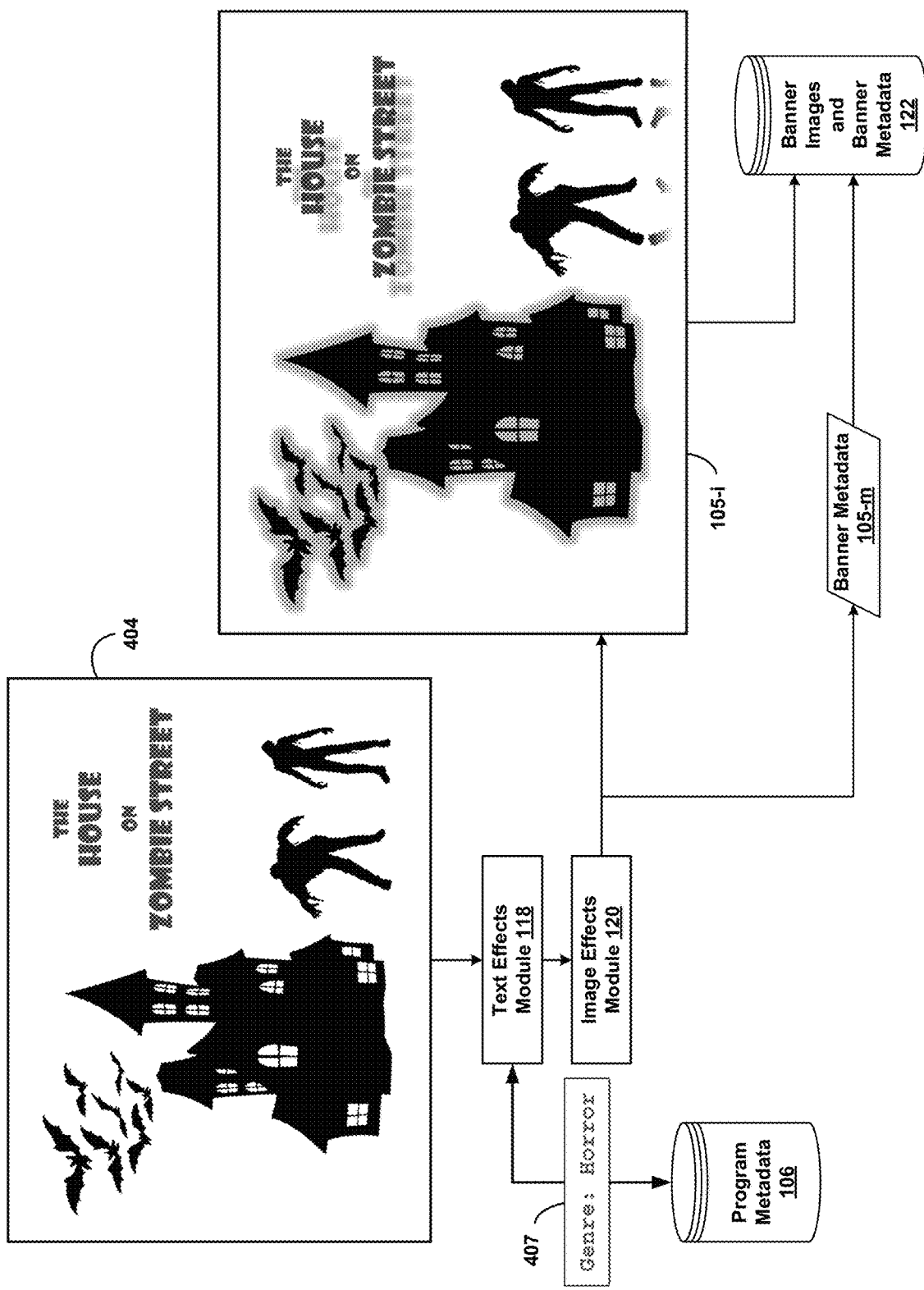

FIG. 4D next illustrates generation of text effects and image effects, producing the banner image 105-i, which corresponds to the banner image of FIG. 3. An intermediate banner image 404, corresponding to the iconic image 402 with the banner box 410 placed according to the bounding box metadata 105 and styled according to the font and text metadata 409, may be input to the text effects module 118. Additionally or alternatively, the input may be the iconic image 402 and the font and text metadata 409 that specifies how to generate the intermediate banner image 404. The text effects module 118 may determine the movie genre 407 by accessing the program metadata 106, or the genre may be included in metadata input to the text effects module 118. The input may also be passed to the image effects module 120 in a similar manner.

The text effects module 118 may generate appropriate text effects based on the movie genre 407, and the image effects module 120 may similarly generated appropriate image effects, also based on the movie genre. In the present illustrative example, the text effects are shadowing, and the image effects are glow and reflections, as noted above. The image effects module 120 may then output the final banner image 105-i and banner metadata 105-m, both of which may be stored in the banner images and banner metadata database 122. Content distribution or delivery providers may the access the banner images and banner metadata database 122 to retrieve banner images for display to end users, such as subscribers.

The text effects module 118 and the image effects module may use respective analytical models to determine text and image effects based on movie genre. The analytical models may be a rules-based models that consider the movie title, genre, and/or other characteristics, in the context of text and/or image effect rules. In another embodiment, the analytical models could be a ML predictor models that employ respective artificial neural networks trained with known examples of text and/or image effects in order to predict appropriate aesthetic and/or stylistic text and/or image effects given movie title, genre, and/or other characteristics, for example. Additional or alternative factors or aspects may be used in determining text and image effects. For example, the iconic image content may be used evaluate an overall theme, which may then also be used to determine appropriate effects. Image content could be recognized using a ML predictor model, for example.

The operation illustrated in FIGS. 4A-4D and described above is provided by way of example. Additional and/or alternative operations may be involved, and additional and/or alternative operational components may be employed. Non-limiting examples of additional and/or alternative operations may include the generation of multiple banner images for a given movie (or other program content), and font selection that may mix different fonts within the same title (or other banner text). For example, different fonts could be used on different lines of broken-up banner text, or even within the same lines of banner text. In addition, any or more of the banner generation operations may include interactive program interfaces for allowing user viewing or curation of intermediate results. Such a capability may allow a user trained in, or with knowledge of, manual banner generation to evaluate intermediate results, and possibly modify or revise them according to aesthetic judgement, for example. In this way, the automated banner generation system and/or any of its components may enable tuning or training adjustments by human interaction. Finally, as noted, the output of an automated banner generation system may be banner images created with banners overlaid and text and image effects applied, or selected iconic images with associated banner metadata that specifies parameters for banner placement and stylistic features (e.g., banner bounding box, image coordinates, text, font, etc.). Further, the type of output could be a specified as a settable operational parameter.

In view of possible variations of automated banner generation systems, the example operation description should not be view as limiting with respect to other possible embodiments of automated banner image generation systems or operational procedures for automated banner image generation.

B. Example Operational Models

As described above, the various example operational modules of the automated banner image generation system 100 may apply respective analytical models to input data in order to generate one or more intermediate or incremental banner image elements (e.g., banner bounding box, font, text effects, etc.). In accordance with example embodiments, an analytical model may be a software program, program component, or application implemented on a computing system, and configured for carrying out computations and/or calculations to achieve a desired result. As also described, any one or more of the respective analytical models could be or include a rules-based model or a ML predictor model. General principles and techniques of both types of model are well-known, and described below in terms of generic operation, with reference to FIGS. 5 and 6.

Figure 5:
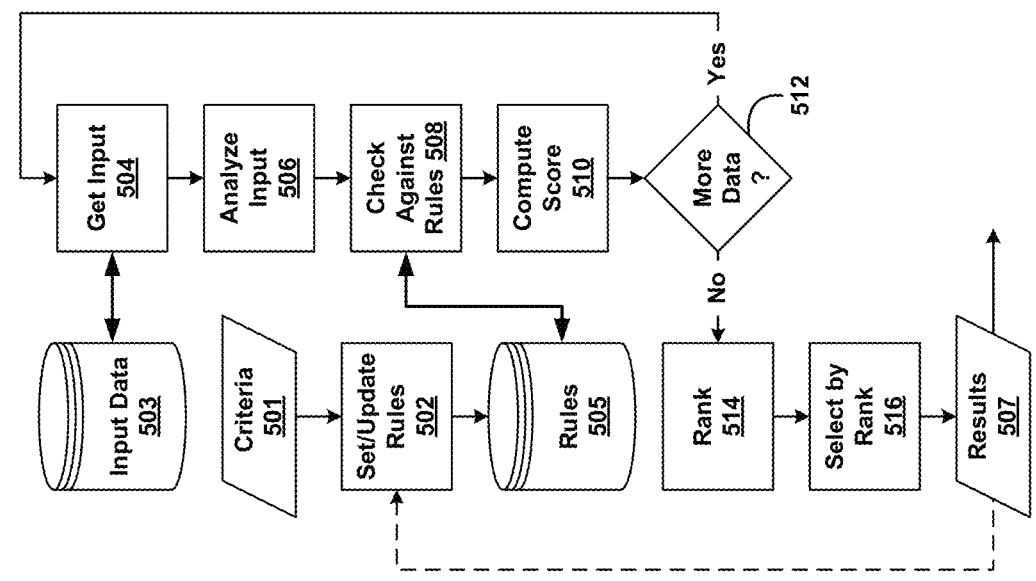
FIG. 5 illustrates an example operational architecture of an example rules-based model that can be applied to automated banner image generation, in accordance with example embodiments.

FIG. 5 illustrates an example generic operational architecture of an example rules-based model 500 that can be applied to automated banner image generation, in accordance with example embodiments. The elements of the rule-based model 500 may include program components or module, as well as data storage, such as databases. By way of example, operation is described for applying rules-based for optimal selection of a set of input data that represents candidates or choices may be evaluated for compliance with specified rules or criteria.

Prior to applying the model 500 to a rules-based selection, a rules database 505 may be configured with rules by way of a set/update rules operation 502. As indicated, criteria 501 may be input to the set/update rules operation 502, which then stores corresponding rules in the rules database 505, for example. Rules may be one or more lists of conditions or characteristics that may be subsequently compared to characteristics found in input data.

A get input operation 504 may retrieve or receive input data 503, and then analyze the input 506 for the presence or quantifiable property corresponding to one or more expected or predetermined characteristics. Input could also come source other than a database, such as directly from a client device, for example. The results of the analysis may be checked against rules in a rules database 508, as indicated. The results of the rule check 508 may be used to compute a score 510, where the score may quantify how well the analyzed data conforms to the rules.

Operation next checks if there is more data 512. If there is, as indicated by the "yes" branch, operation returns to the get input operation 504, and again performs the input analysis 506, rule check 508, and score computation 510. This sequence of operations may repeat until there is no more date, as indicated by the "no" branch, at which point the scores are ranked 514, and a highest-rank selection 516 selects the input data that complies best with the rules. The results may optionally be fed back to the set/update rules operation 502 in order to update or tune the rules according to running results. This operation may help introduce a degree of diversity and/or "fuzziness" into the rules if it is desirable to produce large numbers of results 507 that do not appear rigidly conform to a strict rule-based pattern. For example, fuzziness in the rules could be used to avoid always selecting exactly the same font style or color for a given movie genre. Other examples of diversity in applications of rules-based selection are possible as well.

An example of application of a rules-based model may be described by considering the text placement operation of the text placement module 108 described above for determining where to place a banner on an iconic image 402. Referring again to FIGS. 4A and 4B, the input data could be the iconic image 402 and ROI metadata 401 output by the image selection module 102, and the title and genre 405 retrieved from the program metadata database 106. The rules 505 could specify criteria for banner placement, such as image characteristics ranked according to a numerical preference. Non-limiting examples of ranked image characteristics may include low-interest ROIs, candidate locations adjacent to faces, candidate locations near the top of an iconic image. Other characteristics could be included in the ranking as well.

The operations of the model 500 described above could be carried out over the ROIs of a given input iconic image. More particularly, each ROI in the ROI metadata could be analyzed 506 to determine or derive properties that may be checked against rules 508, followed by computation of a score 510. Once all of the ROIs have scores, they may be ranked 514, and the optimal ROI selected for banner placement. In a final operation, not necessarily shown in FIG. 5, a banner bounding box may be determined and its parameters recorded in the bounding box metadata 403.

Similar operational examples of rules-based model operation may be described for the other operational modules of the automated banner generation system 100. Next, generic operation of a ML predictor model is described.

Figure 6:
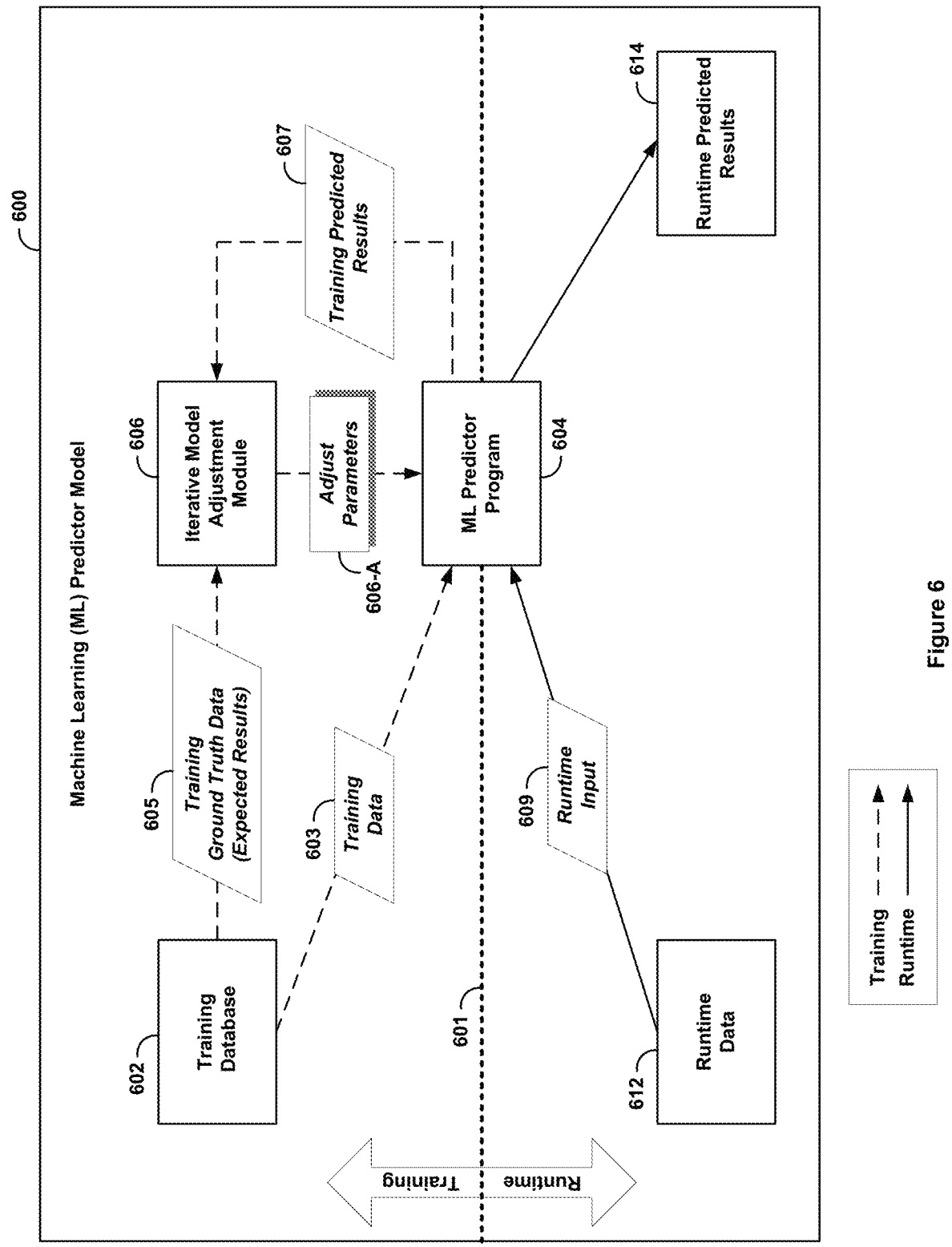
FIG. 6 is an example architecture of an example machine-learning predictor model that can be applied to automated banner image generation, in accordance with example embodiments.

FIG. 6 is an example architecture of an example machine-learning predictor model 600 that can be applied to automated banner image generation, in accordance with example embodiments. In particular, FIG. 6 illustrates general operation of a ML predictor model that could be implemented as program or executable code on a computing device or system.

Generally, a ML predictor model described herein, such as ML predictor model 600, may operate in two modes: training mode and runtime mode. In training mode, the ML predictor model 600 may be "trained" to recognize various characteristics or properties of data, such as specific content in images (e.g., faces, animals, buildings, geologic features, or blank space), or characteristics of images (e.g., coordinates of "regions of interest," cropping characteristics, image effects, or text styles). In runtime mode, the ML predictor model 600 may operate to predict a likelihood that input runtime data exhibits one or more of the characteristics that the model has been trained to recognize. The model may also provide parameters of the predicted characteristics, such as spatial coordinates of faces in images, for example.

As discussed above, the ML predictor model 600 shown in FIG. 6 may be implemented with or using artificial neural networks (ANNs) that function to extract features from input data (e.g., digital images), predict characteristics and associated confidence levels of predicted characteristics. An example implementation is now briefly described.

As is known, an ANN may be computationally constructed as a plurality of interconnected layers, including an input layer, an output layer, and one or more intermediate layers. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data, for example, may involve inputting training data that represents known (training) examples of the particular class of content for which results are known, and then adjusting parameters (or weights) of the nodes in a feedback-like procedure to maximize a probability that a predicted output by the ANN output (e.g., what the ANN "thinks" the input data represents) matches the training examples.

For some types of applications in which an ANN is used, it may be configured to predict a probability or probabilities that a given input matches one or more elements or classes of elements of a known discrete set of elements or classes of elements. In this context, the ANN or the system in which it is implemented may be referred to as a "classifier," signifying a classification operation. A classifier may also be configured to make an actual selection from among a known discrete set of elements or classes of elements. For other types of applications in which an ANN is used, it may be configured to compute, given an input, a probable continuous value (e.g., a scalar) or set of values (e.g., a vector) as output, possibly together with confidence levels for the predicted output(s). In this context, the ANN or the system in which it is implemented may be considered as performing one or another form of regression analysis. Example embodiments of ML predictors described herein may include or employ either or both types of ANN implementations, in accordance with the descriptions below. Further, other types of ANNs are possible, and may be used or included in example embodiments of ML predictors described herein.

Subsequent to training, one or more "runtime" instances a given type of data may be input to a trained ANN classifier to determine a quantitative prediction or probability that the runtime data contains a particular class of content. In this sense, the ANN classifier is trained to recognize content that matches or is similar to the known examples of the particular class of content. Similarly, one or more runtime instances a given type of data may be input to a trained ANN regression program to determine an output value or values. In this sense, the ANN regression program is trained to compute (e.g., continuous-valued) results that match or are similar to the known examples of results for a particular class of content. For either case, the training examples of the particular class of content are referred to as "ground truth" or just "truth," and the output of an ANN is referred to as "predictions."

In the field of image recognition, a type of ANN called a convolutional neural network (CNN) is known to be effective. Image data in the form of pixel values, for example, may be input to the input layer of a CNN. Conceptually, the layers of a CNN evaluate different levels (e.g. hierarchical) of structure represented in the image data. This may be implemented mathematically by different learnable filters at each layer that are convolved with the inputs of the previous layer (hence, convolutional NN). Training may involve adjusting weights of the nodes, as well as parameters of the filters. This very simplified explanation is meant only to provide some context for the present, and should not be seen limiting with respect to example embodiments described herein. Further, while example embodiments described below include a CNN, this is not necessarily required of all possible implementations.

In FIG. 6, training operation of a ML predictor model is illustrated in an upper portion of the figure, and runtime is illustrated in a lower portion. A dashed horizontal line 601 separates figure elements of the two types of operation, as indicated by the upward and downward arrows labeled "training" and "runtime," respectively. Information and/or data flow is depicted with dotted arrows for training operation, and with solid arrows for runtime operation, as indicated by the legend at the bottom of FIG. 6.

During training, training data 603 from training database 602 are input to the ML predictor program 604, which generates training predicted results 607. Training expected results 605, which may be considered ground truths, may be input to the iterative model adjustment module 606, which also receives the training predicted results 607. Through an iterative process of comparing the training predicted results 607 with the training master training predicted results 605, parameters of the ML predictor program may be adjusted (606-A) to bring the training predicted results into as close as possible agreement with the ground truths.

In practice, the iterative adjustment module 606 may not necessarily be a distinct module of the system, but rather may be representational of feedback-like process carried out during training. For example, training an ANN may entail adjusting weights of nodes using a back-propagation technique. As such, there may not be a separate or distinct module or program component that performs a comparison of the training predicted results with known results (ground truth). Rather, the adjustment process may entail computational operations that are carried out during training and based on quantitative comparison of predicted and known training results. For the purposes of discussion herein, however, it is at least conceptually convenient to represent parameter adjustment as an identified module or component. Explicit identification of an iterative adjustment module should not be taken as limiting with respect to example embodiments discussed herein or other possible embodiments not necessarily included in the discussion.

Also during training, the accuracy of a match between a predicted and known training results may be quantitatively expressed as a confidence level. In accordance with example embodiments, a confidence level may take on a value between zero and one (i.e., [0,1]), where zero corresponds to the lowest (no) confidence, and one corresponds to the highest (complete) confidence.

During runtime operation, illustrated in the lower portion of FIG. 6, runtime input 609 from runtime data 612 are input to the ML predictor program 604, which then outputs runtime predicted results 614. The predicted results may be likelihoods that the runtime input 609 contains or is a feature, property, or characteristic that the ML predictor program 604 has been trained to recognize. For example, if the ML predictor program has been trained to recognize faces in images, then the runtime predicted results 614 may be a likelihood that an input runtime image contains a face (or a particular face). The runtime predicted results may also include spatial coordinates, such as a bounding box, of a face in the input image.

An example of application of a ML predictor model may also be described by considering the text placement operation of the text placement module. The description is similar to that of the rules-based model, except that the ML predictor model may be trained to recognize preferential characteristics for banner placement. At runtime, the trained ML predictor model may be applied the iconic image 402 and ROI metadata 401, and the optimal banner placement recognized according to similarity with known preferential characteristics.

As another example of application of a ML predictor model, the image selection operation of the image selection module 102 may be considered. Referring again to FIG. 4A and FIG. 6, the training database 602 may include known examples of images having a variety of image characteristics, such as faces, animals, buildings, geologic features (e.g., mountains, rivers, etc.). The iterative model 606 may be adjusted such that the ML predictor program 604 is trained to recognize these image characteristics. The training may also involve determining image coordinates of the characteristics. That is, identifying, classifying, and locating ROIs according to image characteristics.

At runtime, the runtime data 612 may be a set of iconic images for a given movie (or content program) that are evaluated one at a time for recognizing one or more of the image features learned during training. Program metadata 106 may also be used to reduce the search space or variety of image characteristics search for, for example. For each iconic image of the set, ROIs may be determined according to recognition by the ML predictor model. Then, an iconic image of the set may be selected according to preferred ROI content. This operation could use a rules-based determination, for example. The selected iconic image and associated ROI metadata may then be output to the text placement module 108, as described above. Note that characteristics of a low-interest ROI could be specified by an absence of one or more image characteristics. In the example of FIG. 4A, the low-interest region 402-*b* may be considered a ROI characterized by a lack of image features, rather than by the presence of specific image features.

Similar operational examples of ML predictor model operation may be described for the other operational modules of the automated banner generation system 100.

IV. Example Method

Figure 7:
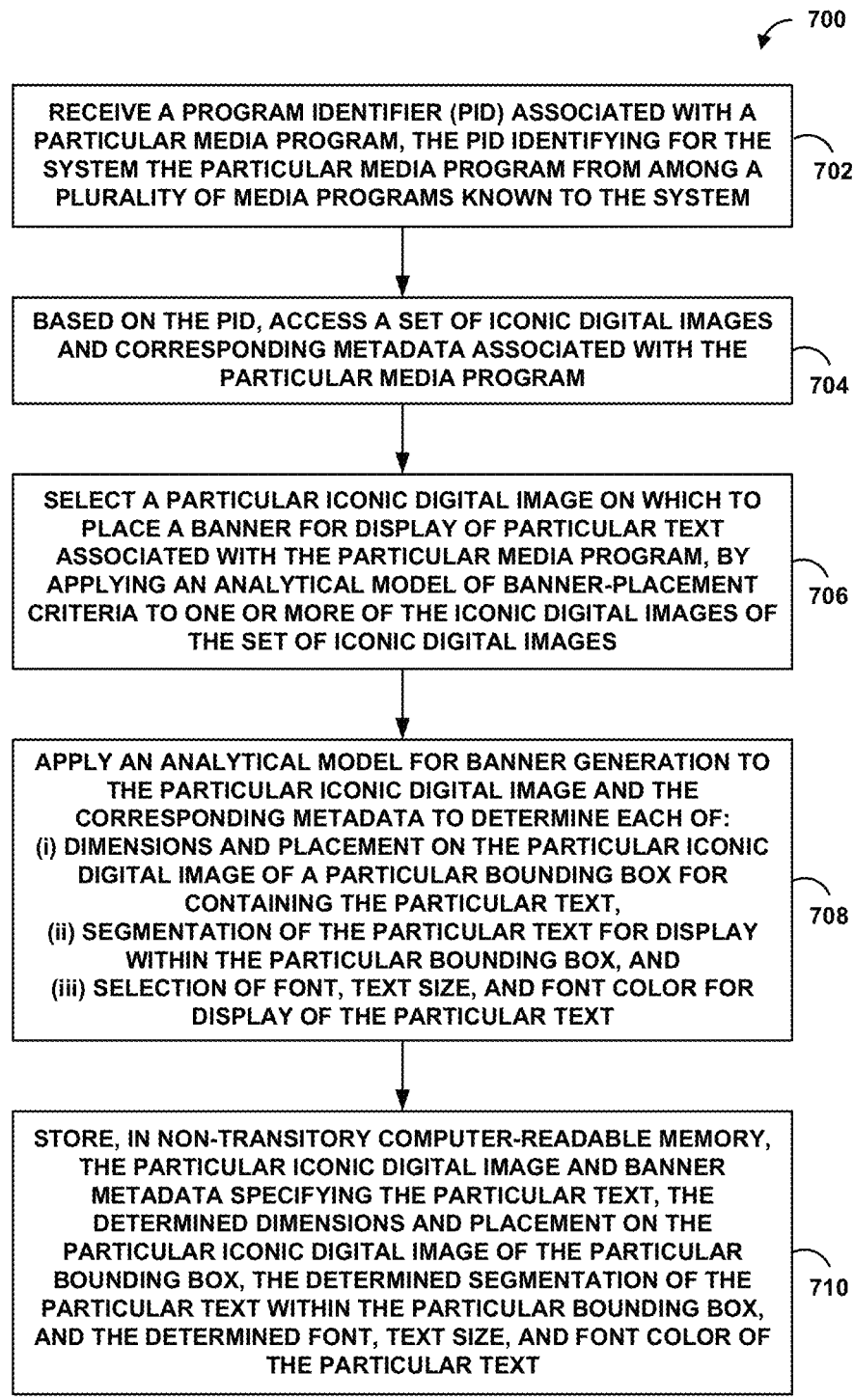
FIG. 7 is a flow chart of an example method of automated banner image generation, in accordance with example embodiments.

FIG. 7 illustrates a flow chart of an example method 700 that may be carried out by an automated banner image generation system, such as automated banner image generation system 100 shown in FIG. 1. The example method 700 may be implemented as computer-readable instructions store in one or another form of memory (such as volatile or non-volatiles memory) of a computing device or system of the content-presentation device. An example of a computing system is shown in FIG. 2. When executed by one or more processors of the computing device or system of the content-presentation device, the instructions may cause the content-presentation device to carry out operations of the example method 700. The computer-readable instructions may additionally be stored on a non-transitory computer readable medium, which may be used, for example, for loading the instructions into the memory of the computing system. In some examples, the non-transitory computer-readable medium could be the memory of the computing system.

At block 702, a program identifier (PID) associated with a particular media program is received by the automated banner image generation system. The PID may be used by the system for identifying the particular media program from among a plurality of media programs known to the system.

At block 704, the automated banner image generation system may access a set of iconic digital images and corresponding metadata associated with the particular media program, based on the PID.

At block 706, the automated banner image generation system may select a particular iconic digital image on which to place a banner for display of particular text associated with the particular media program. In particular, the automated banner image generation system may make the selection by applying an analytical model of banner-placement criteria to one or more of the iconic digital images of the set of iconic digital images.

At block 708, the automated banner image generation system may apply an analytical model for banner generation to the particular iconic digital image and the corresponding metadata in order to determine each of: (i) dimensions and placement on the particular iconic digital image of a particular bounding box for containing the particular text, (ii) segmentation of the particular text for display within the particular bounding box, and (iii) selection of font, text size, and font color for display of the particular text. As described by way of example above, and with reference to FIGS. 1 and 4A-4D, separate analytical models may be used for making each of the determination (i)-(iii), among others. In such an arrangement, the separate analytical models may be considered components of an analytical model for banner generation.

Finally, at block 710, the automated banner image generation system may store the particular iconic digital image and banner metadata specifying the particular text, the determined dimensions and placement on the particular iconic digital image of the particular bounding box, the determined segmentation of the particular text within the particular bounding box, and the determined font, text size, and font color of the particular text. The storage may be don in non-transitory computer-readable memory, although other types of memory could be used.

In accordance with example embodiments the particular text may be a title of the particular media program. For example, the particular media program could be a movie, and particular text could be the title of the movie. Other non-limiting examples could include titles of TV programs (e.g., situation comedies, dramas, newscasts, or sportscasts). Other types of particular text are possible as well, such as names of cast members, directors, or production staff and crew.

In accordance with example embodiments, the PID further may further identify a particular language version of the particular media program. In this case, selecting the particular iconic digital image may involve obtaining the particular text from the corresponding metadata in the particular language in one or another manner. In some arrangements, this could involve selecting from among a plurality of language versions of the particular text in the corresponding metadata. In other arrangements, this could involve performing a machine translation of the particular text from an available language version in the corresponding metadata to the particular language.

In accordance with example embodiments, the analytical model of banner-placement criteria may be or include a first machine learning (ML) predictor model trained for recognizing subject categories and determining size and location of spatial regions of interest (ROIs) containing the subject categories in digital images. In this case, applying the analytical model of banner-placement criteria to the one or more of the iconic digital images of the set of iconic digital images may entail applying the first ML predictor model to the set of iconic digital images to identify one or more candidate iconic digital images each having at least one spatial ROI containing one of the subject categories.

In further accordance with example embodiments, the subject categories could include a set of specified subjects, and an empty set having none of the specified subjects. For example, the set of specified subjects may include faces, animals, building structures, and/or geologic features, among others. Then the empty set could correspond a low-interest ROI, as described above, for example.

In accordance with example embodiments, selecting the particular iconic digital image may involve ranking each candidate digital image according location of the at least one spatial ROI and the subject category contained in the at least one spatial ROI. The ranking could be based on a ranking of subject categories and a ranking of location and size of spatial ROIs containing subject categories. The digital image having the highest ranking could then be selected.

In further accordance with example embodiments, the analytical model for banner generation may be or include separate model components, as described above. More particularly, the model components could be: a bounding-box analytical model for generating and placing a given bounding box within a given spatial region of specified size and location on a given digital image; a text segmentation analytical model for segmenting specified text within a specified bounding box; and a font selection analytical model for selecting font, text size, and font color of the specified text based at least on a specified media program genre. In this arrangement, applying the analytical model for banner generation to the particular iconic digital image and the corresponding metadata may involve: applying the bounding-box analytical model to the particular iconic digital image to create the particular bounding box within a particular one of one or more spatial ROIs that optimally meets bound-box criteria; applying the text segmentation analytical model to the particular text, subject to dimensions of the particular bounding box, to determine segmentation of the particular text within the particular bounding box according to text-segmentation criteria; and applying the font selection analytical model to the particular text, subject to the dimensions of the particular bounding box and a genre of the particular media program determined from the corresponding metadata, to select a particular font, font color, and text size of the particular text.

In further accordance with example embodiments, each of the models may include one or more components that could be a ML model or a rules based model. More particularly, the bounding-box model may be or include one or more of a bounding-box ML model trained for predicting optimal construction of the given bounding box in the given digital image, or a rule-based bounding box construction model. Similarly, the text segmentation analytical model may be or include one or more of a segmentation ML model trained for predicting optimal segmentation of the specified text within the specified bounding box, or a rule-based segmentation model. And the font selection analytical model may be or include one or more of a font selection ML model trained for predicting an optimal selection of font, text size, and font color subject to the dimensions of the given bounding box and the specified genre of the particular media program, or a rule-based font selection model.

In accordance with example embodiments, the set of iconic digital images may include a subset of pre-cropped digital images and one or more uncropped, raw images. In this arrangement, selecting the particular iconic digital image on which to place the banner for display of the particular text associated with the particular media program may entail first determining, based on applying the analytical model of banner-placement criteria, that none of the pre-cropped digital images satisfies the banner-placement criteria. Then, in response to the first determination, a ML cropping model may be applied to the one or more uncropped raw images to generate a cropped digital image that accommodates the banner-placement criteria.

In accordance with example embodiments, the example method may further involve applying the analytical model for banner generation to the particular iconic digital image and the corresponding metadata in order to determine text effects and/or image effects to apply to the particular text, and further storing the determined text effects and/or image effects in the banner metadata. As described above, text effects and image effects could be generated by additional analytical models or model components.

V. Example Variations

Although the examples and features described above have been described in connection with specific entities and specific operations, in practice, there are likely to be many instances of these entities and many instances of these operations being performed, perhaps contemporaneously or simultaneously, on a large scale. Indeed, in practice, the ML predictor system 100 is likely to include many television broadcasting systems (each potentially transmitting content on many channels) and many content presentation devices, with some or all of the described operations being performed on a routine and repeating basis.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method carried out by a computer-implemented system configured for automated generation of banner images, the method comprising:
   receiving a set of iconic digital images comprising a subset of pre-cropped digital images and one or more uncropped, raw images and further comprising metadata corresponding to the iconic digital images, wherein both the iconic digital images and the metadata are associated with a particular media program;
   selecting a particular iconic digital image on which to place a banner for display of particular text, by applying an analytical model of banner-placement criteria to one or more of the iconic digital images of the set of iconic digital images;
   applying an analytical model for banner generation to the particular iconic digital image and the corresponding metadata in a plurality of discrete analytical phases to determine parameters specifying a corresponding plurality of data components of a particular banner for the particular iconic image; and
   storing, in computer-readable memory, the particular iconic digital image and banner metadata specifying the determined parameters,
   wherein selecting the particular iconic digital image comprises selecting between one of: (i) a pre-cropped digital image that satisfies the banner-placement criteria, or (ii) when none of the pre-cropped digital images satisfies the banner-placement criteria, a cropped digital image that is generated by applying a machine learning cropping model to the one or more uncropped raw images, and that satisfies the banner-placement criteria.

2. The method of claim 1, wherein the particular text is a title of the particular media program.

3. The method of claim 1, wherein the plurality of data components of the particular banner comprise: (i) dimensions and placement on the particular iconic digital image of a particular bounding box for containing the particular text, (ii) segmentation of the particular text for display within the particular bounding box, and (iii) selection of font, text size, and font color for display of the particular text.

4. The method of claim 1, wherein the analytical model of banner-placement criteria comprises a machine learning (ML) predictor model trained for recognizing subject categories and determining size and location of spatial regions of interest (ROIs) containing them in digital images, and wherein selecting the particular iconic digital image further comprises:
applying the ML predictor model to the set of iconic digital images to identify one or more candidate iconic digital images each having at least one spatial ROI containing one of the subject categories;
ranking each candidate digital image according location of the at least one spatial ROI and the subject category contained in the at least one spatial ROI, based on a ranking of subject categories and a ranking of location and size of spatial ROIs containing subject categories; and
selecting the candidate digital image having the highest ranking.

5. The method of claim 1, wherein applying the analytical model for banner generation to the particular iconic digital image and the corresponding metadata in the plurality of discrete analytical phases comprises:
applying the analytical model for banner generation to the particular iconic digital image in a bounding-box phase to create a particular bounding box within a particular one of one or more spatial regions of interest in the particular iconic digital image that optimally meets bound-box criteria;
applying the analytical model for banner generation to the particular iconic digital image in a text-segmentation phase to determine segmentation of the particular text within the particular bounding box according to text-segmentation criteria; and
applying the analytical model for banner generation to the particular iconic digital image in a font-selection phase to select a particular font, font color, and text size of the particular text.

6. The method of claim 5, wherein applying the analytical model for banner generation in the bounding-box phase comprises applying a bounding-box analytical model for generating and placing a given bounding box within a given spatial region of specified size and location on a given digital image,
wherein applying the analytical model for banner generation in the text-segmentation phase comprises applying a text-segmentation analytical model for segmenting specified text within a specified bounding box,
and wherein applying the analytical model for banner generation in the font-selection phase comprises applying a font-selection analytical model for selecting font, text size, and font color of the specified text based at least on a specified media program genre.

7. The method of claim 1, wherein the analytical model for banner generation comprises one or more model components, each of which is at least one of: (i) a machine learning (ML) predictor model trained for predicting one or more data components of a given banner for a given iconic image, or (ii) a rule-based model for determining the one or more data components of a given banner for the given iconic image.

8. The method of claim 1, wherein applying the analytical model of banner-placement criteria to the one or more of the iconic digital images of the set of iconic digital images comprises:

determining that none of the pre-cropped digital images satisfies the banner-placement criteria; and
responsively applying the machine learning cropping model to the one or more uncropped raw images to generate the cropped digital image that satisfies the banner-placement criteria.

9. The method of claim 1, further comprising:
applying the analytical model for banner generation to the particular iconic digital image and the corresponding metadata to determine text effects and/or image effects to apply to the particular text; and
further storing the determined text effects and/or image effects in the banner metadata.

10. A system for automated generation of banner images, the system comprising:
one or more processors; and
memory storing instructions that, when executed by the one or more processors, cause the system to carry out operations including:
receiving a set of iconic digital images comprising a subset of pre-cropped digital images and one or more uncropped, raw images and further comprising metadata corresponding to the iconic digital images, wherein both the iconic digital images and the metadata are associated with a particular media program;
selecting a particular iconic digital image on which to place a banner for display of particular text, by applying an analytical model of banner-placement criteria to one or more of the iconic digital images of the set of iconic digital images;
applying an analytical model for banner generation to the particular iconic digital image and the corresponding metadata in a plurality of discrete analytical phases to determine parameters specifying a corresponding plurality of data components of a particular banner for the particular iconic image; and
storing, in computer-readable memory, the particular iconic digital image and banner metadata specifying the determined parameters,
wherein selecting the particular iconic digital image comprises selecting between one of: (i) a pre-cropped digital image that satisfies the banner-placement criteria, or (ii) when none of the pre-cropped digital images satisfies the banner-placement criteria, a cropped digital image that is generated by applying a machine learning cropping model to the one or more uncropped raw images, and that satisfies the banner-placement criteria.

11. The system of claim 10, wherein the particular text is a title of the particular media program.

12. The system of claim 10, wherein the plurality of data components of the particular banner comprise: (i) dimensions and placement on the particular iconic digital image of a particular bounding box for containing the particular text, (ii) segmentation of the particular text for display within the particular bounding box, and (iii) selection of font, text size, and font color for display of the particular text.

13. The system of claim 10, wherein the analytical model of banner-placement criteria comprises a machine learning (ML) predictor model trained for recognizing subject categories and determining size and location of spatial regions of interest (ROIs) containing them in digital images,
and wherein selecting the particular iconic digital image further comprises:
applying the ML predictor model to the set of iconic digital images to identify one or more candidate iconic digital images each having at least one spatial ROI containing one of the subject categories;
ranking each candidate digital image according location of the at least one spatial ROI and the subject category contained in the at least one spatial ROI, based on a ranking of subject categories and a ranking of location and size of spatial ROIs containing subject categories; and
selecting the candidate digital image having the highest ranking.

14. The system of claim 10, wherein applying the analytical model for banner generation to the particular iconic digital image and the corresponding metadata in the plurality of discrete analytical phases comprises:
applying the analytical model for banner generation to the particular iconic digital image in a bounding-box phase to create a particular bounding box within a particular one of one or more spatial regions of interest in the particular iconic digital image that optimally meets bound-box criteria;
applying the analytical model for banner generation to the particular iconic digital image in a text-segmentation phase to determine segmentation of the particular text within the particular bounding box according to text-segmentation criteria; and
applying the analytical model for banner generation to the particular iconic digital image in a font-selection phase to select a particular font, font color, and text size of the particular text.

15. The system of claim 14, wherein applying the analytical model for banner generation in the bounding-box phase comprises applying a bounding-box analytical model for generating and placing a given bounding box within a given spatial region of specified size and location on a given digital image,
wherein applying the analytical model for banner generation in the text-segmentation phase comprises applying a text-segmentation analytical model for segmenting specified text within a specified bounding box,
and wherein applying the analytical model for banner generation in the font-selection phase comprises applying a font-selection analytical model for selecting font, text size, and font color of the specified text based at least on a specified media program genre.

16. The system of claim 10, wherein the analytical model for banner generation comprises one or more model components, each of which is at least one of: (i) a machine learning (ML) predictor model trained for predicting one or more data components of a given banner for a given iconic image, or (ii) a rule-based model for determining the one or more data components of a given banner for the given iconic image.

17. The system of claim 10, wherein applying the analytical model of banner-placement criteria to the one or more of the iconic digital images of the set of iconic digital images comprises:
determining that none of the pre-cropped digital images satisfies the banner-placement criteria; and
responsively applying the machine learning cropping model to the one or more uncropped raw images to generate the cropped digital image that satisfies the banner-placement criteria.

18. The system of claim 10, wherein the operations further include:
applying the analytical model for banner generation to the particular iconic digital image and the corresponding metadata to determine text effects and/or image effects to apply to the particular text; and
further storing the determined text effects and/or image effects in the banner metadata.

19. A non-transitory computer-readable medium having instructions stored thereon that, when executed by one or more processors of a system for automated generation of banner images, cause the system to carry out operations including:
receiving a set of iconic digital images comprising a subset of pre-cropped digital images and one or more uncropped, raw images and further comprising metadata corresponding to the iconic digital images, wherein both the iconic digital images and the metadata are associated with a particular media program;
selecting a particular iconic digital image on which to place a banner for display of particular text, by applying an analytical model of banner-placement criteria to one or more of the iconic digital images of the set of iconic digital images;
applying an analytical model for banner generation to the particular iconic digital image and the corresponding metadata in a plurality of discrete analytical phases to determine parameters specifying a corresponding plurality of data components of a particular banner for the particular iconic image; and
storing, in computer-readable memory, the particular iconic digital image and banner metadata specifying the determined parameters,
wherein selecting the particular iconic digital image comprises selecting between one of: (i) a pre-cropped digital image that satisfies the banner-placement criteria, or (ii) when none of the pre-cropped digital images satisfies the banner-placement criteria, a cropped digital image that is generated by applying a machine learning cropping model to the one or more uncropped raw images, and that satisfies the banner-placement criteria.

20. The non-transitory computer-readable medium of claim 19, wherein applying the analytical model for banner generation to the particular iconic digital image and the corresponding metadata in the plurality of discrete analytical phases comprises:
applying the analytical model for banner generation to the particular iconic digital image in a bounding-box phase to create a particular bounding box within a particular one of one or more spatial regions of interest in the particular iconic digital image that optimally meets bound-box criteria;
applying the analytical model for banner generation to the particular iconic digital image in a text-segmentation phase to determine segmentation of the particular text within the particular bounding box according to text-segmentation criteria; and
applying the analytical model for banner generation to the particular iconic digital image in a font-selection phase to select a particular font, font color, and text size of the particular text.

\* \* \* \* \*